March 1, 1938. R. F. EDDY 2,109,822
METHOD OF AND APPARATUS FOR HARVESTING FROZEN CONFECTIONERY PRODUCTS
Filed June 25, 1935 2 Sheets-Sheet 1
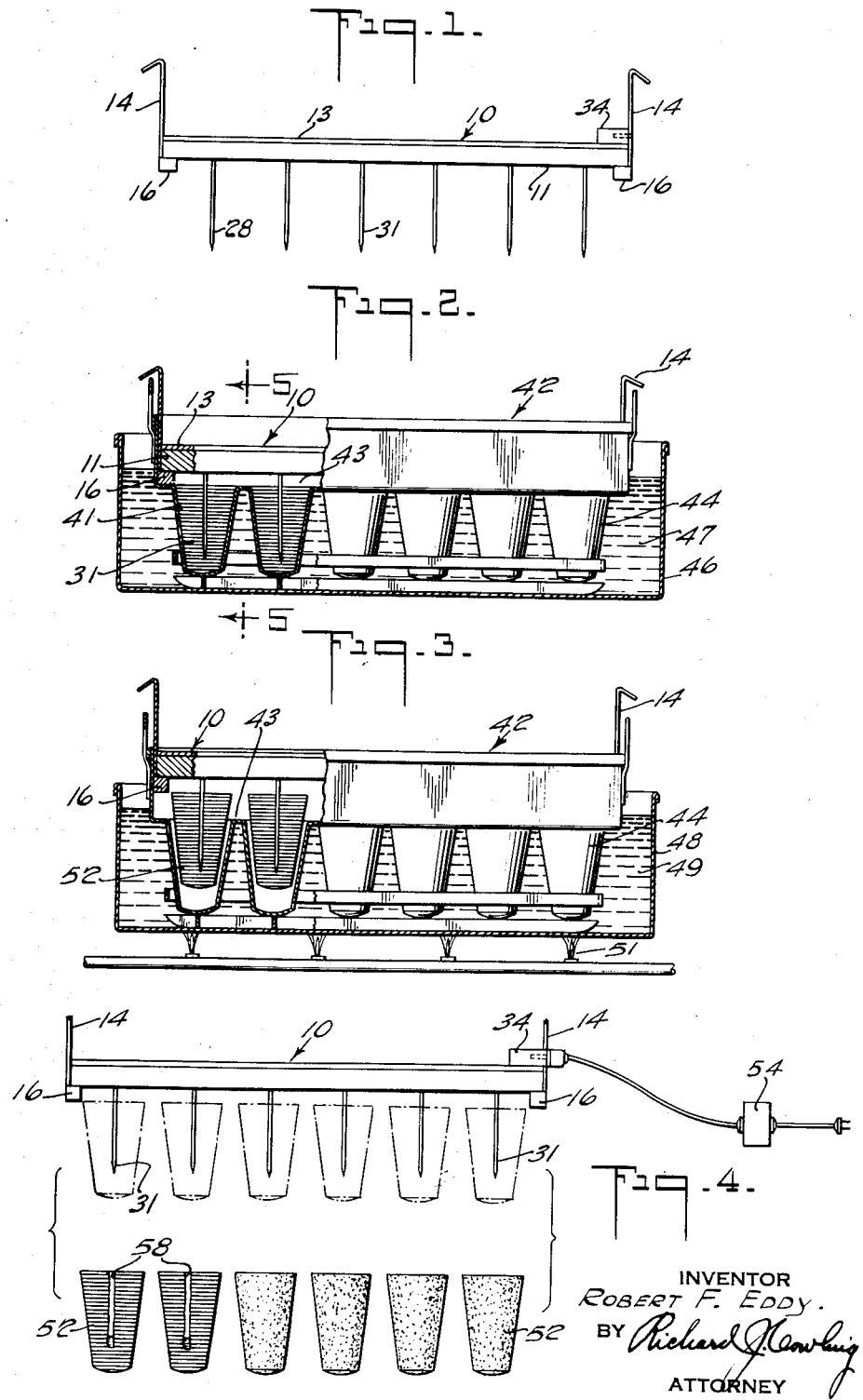
INVENTOR
ROBERT F. EDDY.
BY
ATTORNEY March 1, 1938. R. F. EDDY 2,109,822
METHOD OF AND APPARATUS FOR HARVESTING FROZEN CONFECTIONERY PRODUCTS
Filed June 25, 1935 2 Sheets-Sheet 2
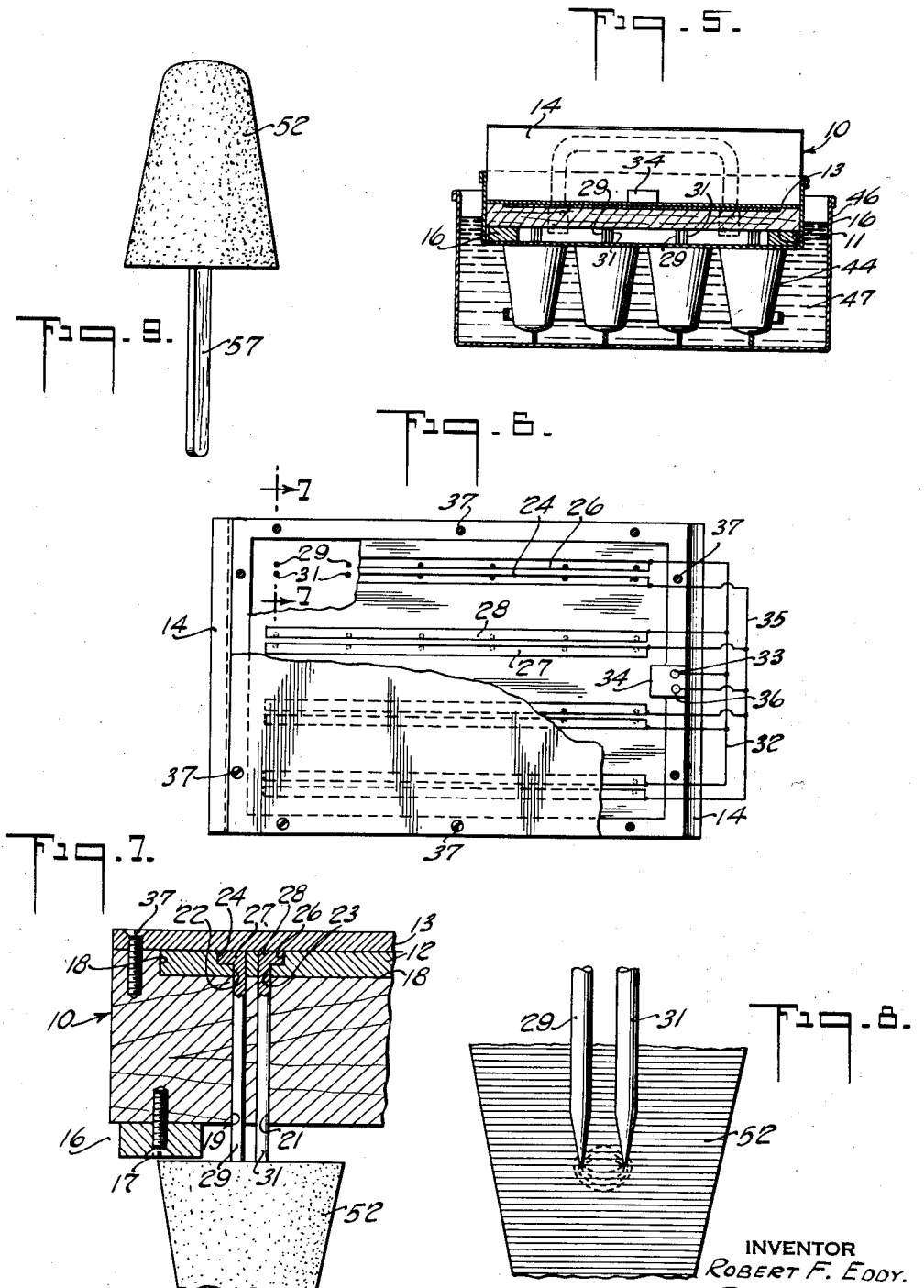
INVENTOR
ROBERT F. EDDY.
BY
ATTORNEY Patented Mar. 1, 1938

2,109,822

UNITED STATES PATENT OFFICE 2,109,822

METHOD OF AND APPARATUS FOR HARVESTING FROZEN CONFECTIONERY PRODUCTS

Robert F. Eddy, Long Beach, Calif., assignor to Joe Lowe Corporation, New York, N. Y., a corporation of Delaware Application June 25, 1935, Serial No. 28,365

8 Claims. (Cl. 107—54)

The present invention relates to a method of and apparatus for simultaneously forming, refrigerating and harvesting a plurality of frozen confectionery bodies, such as frozen confections provided with openings adapted to receive handle members or fillings, bars, individual servings and the like made from water-ice, sherbet, ice cream or frozen custard by a molding process, using a portable carrier having a plurality of depending spurs or rods onto which the material is to be frozen and by which the frozen bodies may be removed from their respective molds and manipulated during the coating, bagging and/or packaging operations. The invention has particular relation to a method of and means for simultaneously removing a plurality of such frozen bodies from their respective spurs or rods electrically in a single operation in a most efficient, economical and sanitary manner.

Heretofore, it has been a practice, in the making of frozen bodies of the character described, to use multiple cavity molds and carriers provided with a single spur or rod adapted to be frozen in each mold. These carriers were made in two ways, to-wit, a hollow spur having an electrical heating element or coil mounted therein, which heated the spur and caused the frozen mass to melt adjacent thereto and thereby breaking the bond between the spur and the frozen substance, and by providing a flat metal spur with a stripper plate which was adapted to be moved relative to the spur or vice versa, thereby causing pressure to be exerted on the tops of the confectionery product to force it from the spur. Such carriers were quite heavy and tiresome to operate, depended upon the strength and skill of the operator, and had numerous parts that were likely to get out of order. The electrically heated spur was only adaptable for making confectionery bodies having a hole or aperture therein for receiving a handle member or filling, since the hollow spur or rod must necessarily be quite large to hold an electric heating coil within. Such a hole or opening was too unsightly for the manufacture of bars or individual servings. The flat metal spur with the stripper plate that engaged the tops of the confections and forced them from the spurs or rods had a tendency, particularly in the coated confections, to break the coating during the removal operation.

With the present invention all of these difficulties have been overcome, and an exceedingly light weight universal carrier is provided for practicing the method of the invention. In the present type carrier the electrical conductor rods may be made sufficiently large to form an opening in the frozen body capable of receiving a handle member or being filled with a type of filling substance, or they may be made exceedingly small to leave a very small opening that is practically unnoticeable in a confectionery product of the bar or individual serving type.

An object of the present invention is the provision of a simple, inexpensive and sanitary method for simultaneously forming, refrigerating and harvesting a plurality of frozen confectionery products or bodies in a most efficient and sanitary manner.

Another object of the invention is the provision of a simple and inexpensive carrier of the portable type, which is exceedingly light in weight and of durable construction, having no moving or fragile parts to get out of order, and which is adaptable for practicing my new and novel method of forming, refrigerating and harvesting frozen confectionery bodies.

A further object of the invention is to provide a portable carrier of simple, inexpensive and sanitary construction for simultaneously removing a plurality of confectionery bodies from the molds in which they are formed and refrigerated, and for subsequently removing said confectionery bodies from their respective spurs or rods electrically in a single operation in a most efficient and economical manner.

Other and further objects and advantages of the invention reside in the detailed construction of the apparatus, which result in simplicity, economy and efficiency in the manufacture of frozen confectionery bodies of the character described by means of a combination molding and spur plate process, and which objects and advantages will be apparent from the following description, wherein a preferred form of embodiment of the invention is shown, reference being had to the accompanying drawings, forming a part hereof, in which:

Fig. 1 is a side or front elevational view of a portable carrier constructed in accordance with the principles of my invention;

Fig. 2 is a side elevational view, partially in section, showing the carrier of Fig. 1, positioned within a mold structure having a plurality of depending molds filled with material to be frozen, under refrigeration in a brine tank;

Fig. 3 is a side elevational view of the mold and carrier shown in Fig. 2, showing the step of defrosting in a tank of warm water, and illustrating the manner in which the frozen bodies are removed from the molds by means of the carrier;

Fig. 4 is a side elevational view of the carrier shown in Fig. 1, connected to a source of electrical energy, and illustrating the manner in which the frozen bodies are removed from the rods or spurs;

Fig. 5 is a cross-sectional view of the apparatus shown in Fig. 2, the same being taken along the line 5—5 thereof;

Fig. 6 is a top plan view of the carrier shown in Fig. 1, with parts being broken away and with the wiring system being shown diagrammatically for the sake of clearness;

Fig. 7 is an enlarged fragmentary sectional view of the carrier shown in Fig. 6, the same being taken along the line 7—7 thereof;

Fig. 8 is an enlarged fragmentary sectional view of the spurs or rods of the carrier shown in Fig. 1, illustrating the path of the electrical energy through and between the pair of rods frozen in each confectionery body; and Fig. 9 is a perspective view of a completed confectionery product made in accordance with my invention, the same being shown mounted on a handle member.

Referring now to the drawings, and particularly Figs. 1, 6, 7, and 8 thereof, there is shown a portable carrier 10, consisting of three main parts, a main frame structure or base plate 11, an intermediate plate 12 containing the element or unit of the carrier, and a cover plate 13, all of which should be made of bakelite or other non-conducting material. In the event bakelite is used in the construction of the carrier, it will be obvious to those skilled in the art that the electrical element or unit could be molded directly into the material and the carrier thereby made into an integral unit without departing from the spirit of the invention.

The main frame structure or base plate 11 is provided with handle members 14 secured to opposite ends thereof in any suitable manner, and has transversely extending spacer bars or legs 16 mounted on the underside thereof adjacent the ends by screws 17, which prevent the underside of the carrier from coming into contact with the mold pan or material being frozen in the molds. The upperside or top of the plate 11 is recessed, as indicated at 18, and the recessed portion 18 is provided with pairs of spaced apertures 19 and 21 arranged in spaced rows extending longitudinally thereof.

The intermediate plate 12, which is of the same size and shape as the recessed portion 18 of the plate 11, is adapted to be positioned in said recess 18 and is likewise provided with pairs of spaced apertures 22 and 23 arranged in spaced rows extending longitudinally thereof. The apertures 22 and 23 of the plate 12 are spaced so as to be aligned with the apertures 19 and 21 of the plate 11, thereby providing vertical openings entirely through the two plates. The apertures 22 of the plate 12 are connected longitudinally by a recess 24 and the apertures 23 of the plate 12 are likewise connected by a longitudinal recess 26. Mounted in the longitudinal recesses 24 and 26 are metal bus-bars 27 and 28, having spaced bus rods or conductors 29 and 31 integrally connected or secured to the underside thereof and extending downwardly therefrom. The rods 29 and 31 of the bus-bars 27 and 28 are spaced in accordance with the apertures 22 and 23 of the plate 12 and are adapted to extend therethrough, through the apertures 19 and 21 of the plate 11 and project outwardly and downwardly from the bottom of the carrier 10. The distance which the rods 29 and 31 project from the carrier 10 may vary, depending upon the size of the rods, the temperature of the refrigerating brine, etc., so long as they provide sufficient area of contact with the frozen mass to form a bond sufficiently strong to permit removal of the frozen bodies from the molds during the defrosting operation. The bus-bars 27 of each row are connected transversely by a bus-bar 32, which in turn is connected to one side 33 of an electrical plug or socket 34, and the bars 28 of the same rows are connected by a transversely extending bus-bar 35 to the opposite side of the plug 34, as indicated at 36. These wiring connections are all shown diagrammatically in Fig. 7 for the sake of clearness.

The cover plate 13 of the carrier 10 is mounted on top of the plate 11 by means of bolts 37 and is adapted to cover the recessed portion 18 and intermediate plate 12, thereby preventing the hands of the operator from coming in contact with the bus-bars 27, 28, 32, and 35. The plate 13 also acts to keep out dust, dirt, water and the like from the wiring system.

In operation of the carrier 10, a substance 41, such as ice cream mix, flavored syrup, water-ice or other material which is fluid or semi-fluid at normal temperatures, is poured into a mold structure 42, comprising a mold pan 43, having a plurality of depending molds 44 extending downwardly therefrom. The carrier 10 is positioned in the mold structure, the supporting bars or legs 16 resting on the top of the mold pan 43, keeping the underside of the carrier plate 11 from contacting the wet mold pan 43 or the material 41 to be frozen in the molds 44, which when frozen has a tendency to expand and extend slightly above the top of the mold pan 43. Any such contact will cause a bond to form between the carrier 10 and the mold structure 42 preventing ready separation after the defrosting operation.

When the carrier 10 is positioned in the mold structure 42, as shown in Fig. 2, one pair of spaced conductor rods 29 and 31 extend into each mold 44 and the lower ends thereof become submerged in the substance 41 to be frozen therein. The mold structure 42 is then placed into a brine tank 46, containing circulating brine 47, and left therein for a period of from fifteen to thirty minutes until the substance 41 becomes solidly frozen or congealed into an integral body or mass 52, which is firmly bonded to the conductor rods 29 and 31 and the insides of the molds 44.

The mold structure 42 is then removed from the brine tank 46 and momentarily dipped or placed into a defrosting tank 48, containing warm or hot water 49, heated by a gas burner 51 or other suitable means. Within a few seconds the heat of the water 49 will melt the bond between the frozen body 52 and the insides of the molds 44, and the carrier 10 may then be lifted by the handles 14 and separated from the mold structure 41. The frozen bodies 52, which still remain bonded to the conductor rods 29 and 31, will be simultaneously withdrawn from their respective molds 44 by the carrier 10, as best shown in Fig. 3, and may be manipulated as desired. If a coating of chocolate or other material is desired to be applied to the frozen bodies 52, they may be dipped in such material while they remain clinging to the conductor rods 29 and 31 of the carrier 10, and bags or wrappers may subsequently be slipped over each of the bodies 52 while they are still mounted on the rods 29 and 31.

The frozen bodies 52 may be simultaneously removed from the rods 29 and 31, as shown in Fig. 4, by causing an electric current to pass through the conductor rods 29 and 31 and through the frozen mass therebetween, the salts and acids in the flavoring material, etc. providing a sufficient conductor for the current through the frozen mass. The apparatus has been found to work splendidly on either a regular 110 volt direct or alternating house lighting circuit without the addition of any added resistance in the line. However, it has been found that by placing a resistance coil 54 in the circuit the time of releasing the frozen bodies 52 from the conductor rods 29 and 31 is materially reduced. The resistance in the circuit causes the temperature of the rods 29 and 31 to be raised sufficiently to melt the bond between the frozen ice crustals of the body 52 and the rods 29 and 31, thereby releasing them from the carrier 10. In this operation, it will be noted that only sufficient heat is generated in the rods 29 and 31 to break the bond between them and the frozen bodies 52, and that the instant the bond is broken and the body 52 falls from the rods 29 and 31 the circuit is broken and the heating of the rods 29 and 31 of the carrier 10 is stop. Thus, the apparatus is not dependent upon the skill or watchful eye of the operator, and no overheating or burning out of the apparatus can result. It has been found in actual operation of the apparatus that a very slight increase in the temperature of the rods 29 and 31 is effected, with a consequently little or no melting of the confectionery body 52 adjacent the sides is apparent, and that only a few seconds or a fraction of a minute is required to simultaneously effect the release of the entire group of twenty-four confectionery bodies 52.

In the event a handle member 57 is desired for the frozen body 52, it may be inserted in the openings 58 left in the frozen mass when the rods 29 and 31 are removed. In such cases it may be advisable to space the rods 29 and 31 so that the outer dimensions will be the same as the width of the handle 57. The melting of the bond between the rods and the frozen mass 52 is sufficient to soften the mass of cream between the two apertures sufficiently to permit easy insertion of the handle 57. In some instances the heat generated may entirely melt the mass between the rods 29 and 31, as shown in Fig. 4, and the melted material will cause a wetting of the handle member 57 thereby facilitating the formation of a strong bond when the body 52 and handle 57 is stored under refrigeration until sold.

It is obvious that the conductor rods 29 and 31 may be made of various sizes and shapes without departing from the present invention. Large hollow or solid rods may be employed so as to form a large opening in the frozen body 52, which may be filled with a filling or flavoring syrup to make a combination product or multiflavored confection. By the use of very small rods, which will leave a very small practically unnoticeable opening in the frozen body that will not detract from its appearance or saleability, the invention may be used to make bars or individual servings.

Although I have only described in detail one form which the invention may assume, it will be apparent to those skilled in the art that various other modifications may be made therein, such as connecting the conductor rods in series instead of in parallel as shown in the drawings, without departing from the spirit thereof or from the scope of the appended claims.

What I claim is:

1. The method of harvesting a frozen confectionery body from the rods of a portable carrier to which the body is bonded while being frozen in a mold in which it is formed, which comprises the steps of passing an electric current through the rods and the frozen mass to break the bond formed therebetween, and removing the rods from said body.

2. The method of harvesting a frozen confectionery body from the rods of a portable carrier to which the body is bonded while being frozen in a mold in which it is formed, which comprises the steps of removing the frozen body from the mold by means of the carrier and passing an electric current through the rods and the frozen mass to break the bond formed therebetween to release the rods from said body.

3. The method of harvesting a frozen confectionery body from the rods of a portable carrier to which the body is bonded while being frozen in a mold, which comprises the steps of removing the frozen body from the mold by means of the carrier, of passing an electric current through the rods and the frozen mass therebetween to break the bond attaching the frozen body to the rods, and of removing the rods from said frozen body.

4. The method of harvesting a frozen confectionery body from the rods of a portable carrier to which the body is bonded while being congealed in a mold, which comprises the steps of removing the frozen body from the mold by means of the carrier, of passing an electric current between the rods and through the frozen mass to break the bond formed therebetween, and of separating the rods from the frozen body to break the electric circuit thereby preventing any unnecessary heating of said rods.

5. The method of harvesting a frozen confectionery body from the rods of a portable carrier to which the body is bonded while being congealed in a mold, which comprises the steps of removing the body from the mold by means of the carrier, of passing an electric current between the rods and through the frozen mass to break the bond formed therebetween, and of permitting the frozen mass to drop from the rods thereby separating the same and breaking the electric circuit to prevent any unnecessary heating of the rods of said carrier.

6. Apparatus for forming, refrigerating and harvesting a frozen body which comprises a mold for the reception of material to be frozen, and, in combination therewith, a portable carrier adapted to be suspended over said mold, said carrier having spaced electrical conductor rods depending therefrom and adapted to extend into the mold and the substance to be frozen therein, said carrier being removable from the mold with the frozen body firmly bonded to the conductor rods, and means for connecting the rods to a source of electrical energy for passing an electric current between the rods and through the frozen substance for breaking the bond therebetween to release the rods therefrom.

7. Apparatus for forming, refrigerating and harvesting a plurality of frozen bodies simultaneously which comprises a mold having a plurality of spaced cavities for the reception of material to be frozen, and, in combination therewith, a portable carrier adapted to be supported above said mold, said carrier having pairs of spaced electrical conductor rods depending therefrom and so arranged as to extend one pair of rods into each mold cavity and into the substance to be frozen therein, means for simultaneously removing said rods from said mold cavities with the frozen bodies bonded thereto, and means for connecting each pair of rods to a source of electrical energy for passing an electric current between the rods and through the frozen substance for releasing the rods therefrom.

8. Apparatus for forming, refrigerating and harvesting a plurality of frozen bodies simultaneously which comprises a mold having a plurality of spaced cavities for the reception of material to be frozen, and, in combination therewith, a portable carrier adapted to be supported above said mold, said carrier having pairs of spaced electrical conductor rods depending therefrom and so arranged as to extend one pair of rods into each mold cavity and into the substance to be frozen therein, each pair of rods being connected in parallel in a single electrical circuit, means for simultaneously removing said rods from said mold cavities with the frozen bodies bonded thereto, and means for connecting said circuit to a source of electrical energy for passing an electric current between the rods and through the frozen substances for simultaneously releasing the rods therefrom.

ROBERT F. EDDY.